United States Patent
Bayeh et al.

[11] Patent Number: 6,098,093
[45] Date of Patent: Aug. 1, 2000

[54] MAINTAINING SESSIONS IN A CLUSTERED SERVER ENVIRONMENT

[75] Inventors: Elias N. Bayeh, Cary; Gabriel G. Montero, Chapel Hill; Robert C. Will, Holly Springs, all of N.C.

[73] Assignee: International Business Machines Corp., Armonk, N.Y.

[21] Appl. No.: 09/045,986

[22] Filed: Mar. 19, 1998

[51] Int. Cl.[7] ............................. G06F 13/38; G06F 15/17
[52] U.S. Cl. ........................ 709/203; 709/200; 709/250; 709/238
[58] Field of Search .................................. 709/203, 238, 709/250, 200

[56] References Cited

U.S. PATENT DOCUMENTS

| | | | |
|---|---|---|---|
| 5,828,840 | 9/1998 | Cowen et al. | 709/238 |
| 5,848,246 | 12/1998 | Gish | 709/238 |
| 5,908,469 | 6/1999 | Botz et al. | 709/238 |
| 5,924,116 | 7/1999 | Aggarwal et al. | 709/238 |
| 5,928,323 | 7/1999 | Gosling et al. | 709/238 |
| 5,935,249 | 8/1999 | Stern et al. | 709/238 |

*Primary Examiner*—Frank J. Asta
*Assistant Examiner*—Farzaneh Farahi
*Attorney, Agent, or Firm*—A. Bruce Clay

[57] ABSTRACT

A technique, system, and computer program for maintaining session information among multiple clustered computers for servlets and providing those servlets with various session services. The session services are implemented using a plug-in servlet engine. The session information is preferably maintained without using a persistent data store, to avoid performance penalties associated with storing information in persistent storage such as a database. A locking technique is implemented to prevent servlets from inadvertently overwriting each other's session object data. A registration process is preferably used, to optimize communication of configuration property changes. Non-proprietary interfaces are used, allowing for scalability, portability, and maximum industry acceptance of this solution.

33 Claims, 6 Drawing Sheets

MAINTAINING SESSIONS IN A CLUSTERED SERVER ENVIRONMENT

BACKGROUND OF THE INVENTION

1. Field of the Invention

The present invention relates to computer communication, and deals more particularly with a technique, system, and computer program for maintaining session-related state information in a scalable, clustered network environment. This is preferably done in a manner that avoids the need to use persistent storage such as a database to store session information, thereby removing the performance penalty associated with database accesses. Further, a mechanism is provided whereby the integrity of the session data is protected from inadvertent overwriting. The technique is provided using industry-wide, standard APIs, allowing for increased portability, scalability, and acceptance of this solution.

2. Description of the Related Art

The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server".

The HTTP communications protocol uses a request/response paradigm, where the electronic messages sent between communicating computers can be categorized as either requests for information, or responses to those requests, as illustrated above. HTTP does not provide for maintaining any type of state information about the communications, instead treating each request/response pair as a separate and unrelated transaction. This approach works well for many Web transactions. For example, a user may request to see a specific document displayed on his browser. When it has been sent by the server and displayed to the user, there may be no further processing that relates to that request, and therefore nothing more to be done. However, there are many instances where this absence of state information is a serious shortcoming of the protocol. When there is no state information, then a server receiving requests from a client may have no way of knowing that it has received prior requests from this same client, and no way of making any type of logical connection between the multiple requests.

Some example scenarios where state information is an absolute necessity include on-line shopping, searching with successive refinement of search terms, and gathering user profile information. In on-line shopping, a user typically accesses a seller's on-line catalog, which will be displayed to him as some number of Web pages (where a "Web page" is the information displayable in response to a user's request). Typically, the user can display a separate page of information related to each product, to read about the details of that product. Each time the user requests to see a page, a separate HTTP request is typically sent to the Web server where the seller's product catalog is stored. This request indicates that data for a specific product should be gathered and sent to the client machine for display. When the user wishes to order a product, he indicates his selection by clicking on an "Order" button of some type, using a mouse, for example. This causes another request message to be sent to the server, where the request indicates that this is an order for the particular item. Without the ability to maintain state information, each of these requests would be treated as unrelated to the others. There would be no efficient way to collect orders for more than one item into one large order. Further, there would be no efficient way to allow the user to enter his name, address, credit card number, etc. only one time, and have that information apply to all the ordered items.

Searching for information, and then applying refinements to the search criteria, would suffer from the same inconveniences in the absence of state information. Obviously, users would not long tolerate shopping or searching in this way, so various methods of adding state information to HTTP's state-less environment have evolved. A typical approach to the searching scenario is to embed the search criteria into the URL (Uniform Resource Locator) of both the HTTP request and the response. Thus, when the user is viewing the result of his search criteria, those criteria are still available and can be further refined in a subsequent search message created from the text of this search. This carrying-along of the state-related information is not a viable approach in more detailed and complex examples such as on-line shopping, however. To deal with keeping larger amounts of data between related messages, the concept of a "session" has been introduced.

Sessions have been used for many years in other types of environments that preceded HTTP and the Web, and which were state-oriented. For example, the Systems Network Architecture ("SNA") from the International Business Machines Corporation ("IBM") is a state-oriented architecture and protocol. The Open Systems Interconnection ("OSI") architecture and protocols are also state-oriented. In these architectures, a session is a temporary logical connection over which two communicating entities send messages. Certain attributes are associated with the session, such as identifying information for each of the entities. These types of information are state-related information.

This session approach has been added to HTTP transactions by associating a Session Identifier ("Session ID") with each client. A session ID may be any type of identifier that serves to uniquely identify a particular client to the server. This session ID is then sent as part of the HTTP request syntax for each message sent from the client machine. The server uses the session ID to store information related to the transactions with this client, so that the series of transactions can be treated as a logical on-going communication between the client and the server (instead of simply as random, unrelated messages). This is how the server is able to accumulate the information required for a user to perform on-line shopping, and is also how servers can gather information about users that becomes part of a user's profile. The session then encompasses all requests from this client that use this same identifier.

Session IDs have been implemented on top of HTTP using two primary approaches. The first is through use of "cookies". The second is through "URL rewriting". A cookie is an abstract concept referring to storing state information, and passing a reference to that information between the client and server by including an identifier in the HTTP request and responses. When a client issues a first request to a server, the server will create a cookie for this client, and assign a session ID to the cookie. The cookie for the session is then passed back to the client with the response. On the client's subsequent requests, the client sends the session cookie as part of the request. A server typically provides services to many clients, and receiving the client's session identifier as a cookie enables the server to find the information it has kept about previous transactions with this particular client. Transferring the state information in this way allows the client and server to maintain state-related information. However, some browsers do not support cookies as part of the HTTP syntax, or they may allow users to disable cookie support, so the URL rewriting mechanism can be used instead. URL rewriting is a way of ensuring that requests sent to the server will have the session ID plugged into the URL. Web pages that are sent to the client machine often have hypertext links embedded in them. A hypertext link is an address the user can click on from the page, which may cause a request for a different page to be sent to the server. By putting the session ID into the address in that link, the server can maintain state information for the session. Processing by the server is required for rewriting the URLs. That is, before the server sends a page to a client, the server will check to see if the page has URLs embedded in it. If so, the server adds a session ID parameter and the unique identifier for this session into the URL syntax before sending the page.

The Java language is gaining wide acceptance for writing Web applications, as it is a robust portable object-oriented language defined specifically for the Web environment. ("Java" is a trademark of Sun Microsystems, Inc.) Web servers that implement a Java Virtual Machine can be functionally extended using Java "servlets". A servlet is a relatively small executable code object that can be dynamically plugged in, or added, to the code running on the server. Servlets typically perform some specialized function, which can be invoked by the server (or by another servlet) to extend its own functionality. The servlet processes the request, and returns the response to the server (or servlet) that invoked it. Any number of servlets can be running within one server at any given time.

The Java Web Server Toolkit from Sun Microsystems now provides a mechanism called Session Tracking, whereby state information can be maintained and made available to servlets. The state information is stored on the server using a session object. This object is created when a new client session begins, and is kept for the duration of the session. The object stores information about the transactions occurring between the client and the server. An interface to the object is defined so that servlets can access and modify the state information to reflect the transactions they process for that client. The session ID concept is used to correlate a particular session object to the proper client. This session tracking mechanism supports both cookies and URL rewriting for passing the session ID between the client and server (and subsequently to servlets). The session object has some predefined fields for which it will store values. Additional data can be stored with a developer-defined identifier, which can then be used to access the stored data later on.

A number of difficulties exist with session tracking as it is provided, however. The documentation for the Java Web Server Toolkit warns that developers should adopt a naming convention in order to avoid overwriting servlet data values, since an object is shared among servlets. Refer to "Java Web Server 1.1—Session Tracking", located at URL "http://jserv.javasoft.com/products/java-server/documentation/webserver1.1/session_track/SessionTr.html". Further, a limit is placed on the number of sessions that can exist in memory at any one time. This limit is discussed in the same documentation. A limit is used because a very large number of sessions can be active on a particular server, and the session object for each session can grow to an unpredictable size due to the fact that servlets can add any type of information to the object that they need for their function. The limit is implemented with a system variable (referred to as a "property") that specifies the maximum number of memory-resident sessions, and a swapping mechanism that swaps the least-recently used session objects to a disk file when the maximum number is exceeded. The session objects will then be swapped back into memory as they are needed. The swapping carries the performance penalty associated with writing to disk files, and also requires the developer to structure data objects added to the session object so that they are serializable. "Serializable" refers to defining a linear structure for a non-linear object, by which the non-linear object can be written to a linear data stream such as a disk file. Any structures of the session object that are not defined as serializable will not be written to disk when the rest of the object is swapped out. They remain in memory, thus restricting the amount of memory made available for new sessions by the swapping operation.

A common practice for scaling and increasing the capacity of Web servers and Web sites is to increase the number of computer hosts (servers) which perform HTTP processing. These groups of Web servers are shielded by a load-balancing host (such as IBM's Interactive Network Dispatcher) which directs HTTP requests to different Web servers in its pool of servers to spread out the demand. A pool, or group, of servers is also referred to as a cluster of servers. When session services are provided at these clustered servers, the group of sessions can logically be thought of as a pool, or cluster, of sessions. Since the Session Tracking facility in the Java Web Server Toolkit is only valid within the scope of a single Web server, the pool of sessions cannot be properly maintained among a group of clustered Web servers such as this. For example, if a client request is received at one server, and that server maintains information about the on-going session, there is no way for this version of the session information to be made available to a different server in the cluster if the next request from this client goes to a different server.

Accordingly, a need exists for a technique by which these shortcomings in the ability to provide session services in a clustered environment can be overcome. A technique is needed to ensure that servlets do not inadvertently overwrite each other's data that is being created for session state information, while still allowing those servlets to share each other's data. The database access performance penalty must be removed to enable servlets to function optimally. Further, to ensure wide acceptance of a solution, the technique must be portable and must use non-proprietary interfaces. The proposed technique uses a plug-in servlet engine to maintain session information among multiple computers for servlets in a clustered environment, and to provide session services to the servlets. Session information is maintained without using a persistent data store according to the preferred embodiment of this technique. Further, the proposed technique provides a locking mechanism for each session object, to ensure the integrity of the state information contained in the session objects. These benefits are provided using widely-available, non-proprietary features of an Application Programming Interface ("API") such as the Java API and Java Servlet API, allowing for scalability, portability, and maximum industry acceptance of this solution.

SUMMARY OF THE INVENTION

An object of the present invention is to provide a technique whereby session information can be maintained among multiple computers for servlets in a scalable, clustered network environment, providing those servlets with session services.

Another object of the present invention is to provide a technique whereby this session information is maintained without use of persistent storage such as a database.

It is another object of the present invention to provide the session services in a way that protects the integrity of the session information such that servlets do not inadvertently overwrite each other's data.

It is a further object of the present invention to provide these benefits using widely-available, non-proprietary code interfaces, in order to maximize acceptance of the present solution.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process for use in a computing environment having a connection to a network, for managing session-related state information in a clustered server environment, comprising at least one client request; one or more servers; one or more servlets; and one or more servlet engines, each of the engines running in a different one of the servers. Each of the servlet engines comprises a subprocess for configuring the servlet engine, wherein the servlet engine may be configured as a session client or a session server; a subprocess for receiving a client request when the client request is destined for one of the servlets; a subprocess for making any necessary updates to the client request; and a subprocess for forwarding the updated client request to the servlet. The servlet engine configured as a session server further comprises a subprocess for maintaining a plurality of session objects; a subprocess for locating one of the session objects in response to a request from one of the servlets or one of the session clients; and a subprocess for returning the located session object in response to the request. Preferably, the servlet engine configured as a session server further comprises a subprocess for controlling access to the session objects using a locking mechanism. A servlet engine configured as said session client further comprises a subprocess for requesting one of the session objects from the session server; a subprocess for receiving the requested session object; and a subprocess for returning the session object to the session server after processing. Optionally, the session server can be optimized for providing session services by not having application servlets running on the server on which the session server is running. Further, a servlet engine configured as a session client further comprises a subprocess for sending updates for session objects to the session server. Optionally, each of the servlet engines further comprises a subprocess for requesting a list of all valid session identifiers from the session server; a subprocess for requesting the session object for any of the session identifiers from this list; a subprocess for updating the requested session object; and a subprocess for returning the updated session object to the session server for reflecting the updates. Preferably, the session-related state information is maintained without use of a persistent data store, and the code uses standard Application Programming Interface ("API") calls. These API calls may use Remote Method Invocation to achieve transparency at an invoking servlet. Further, a central copy of session-related configuration data can be propagated from the session server to all of the session clients. This optionally includes having each of the session clients register with the session server to enable the propagation to occur whenever the configuration data changes.

The present invention will now be described with reference to the following drawings, in which like reference numbers denote the same element throughout.

DESCRIPTION OF THE PREFERRED EMBODIMENT

Figure 1:
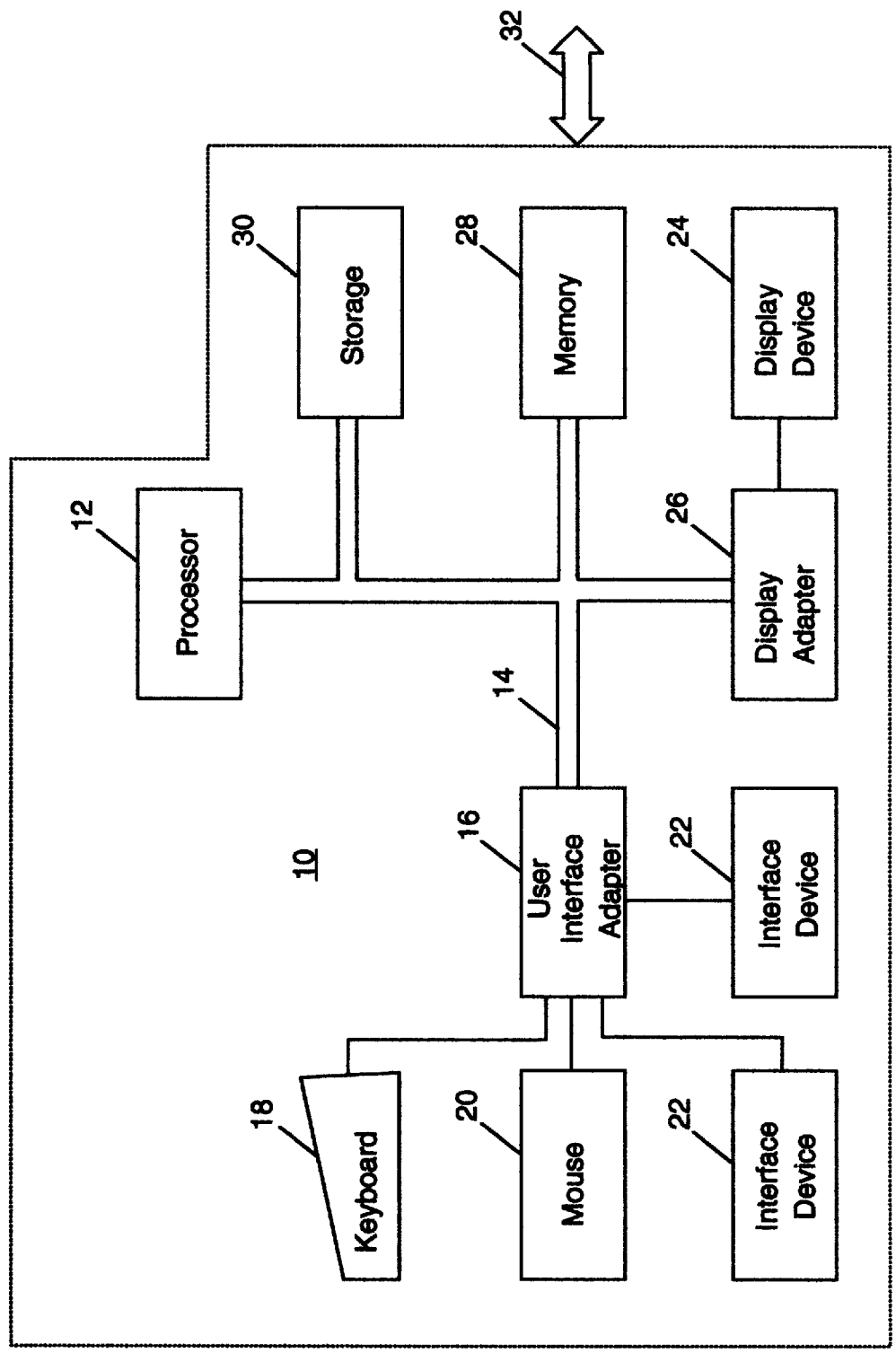
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
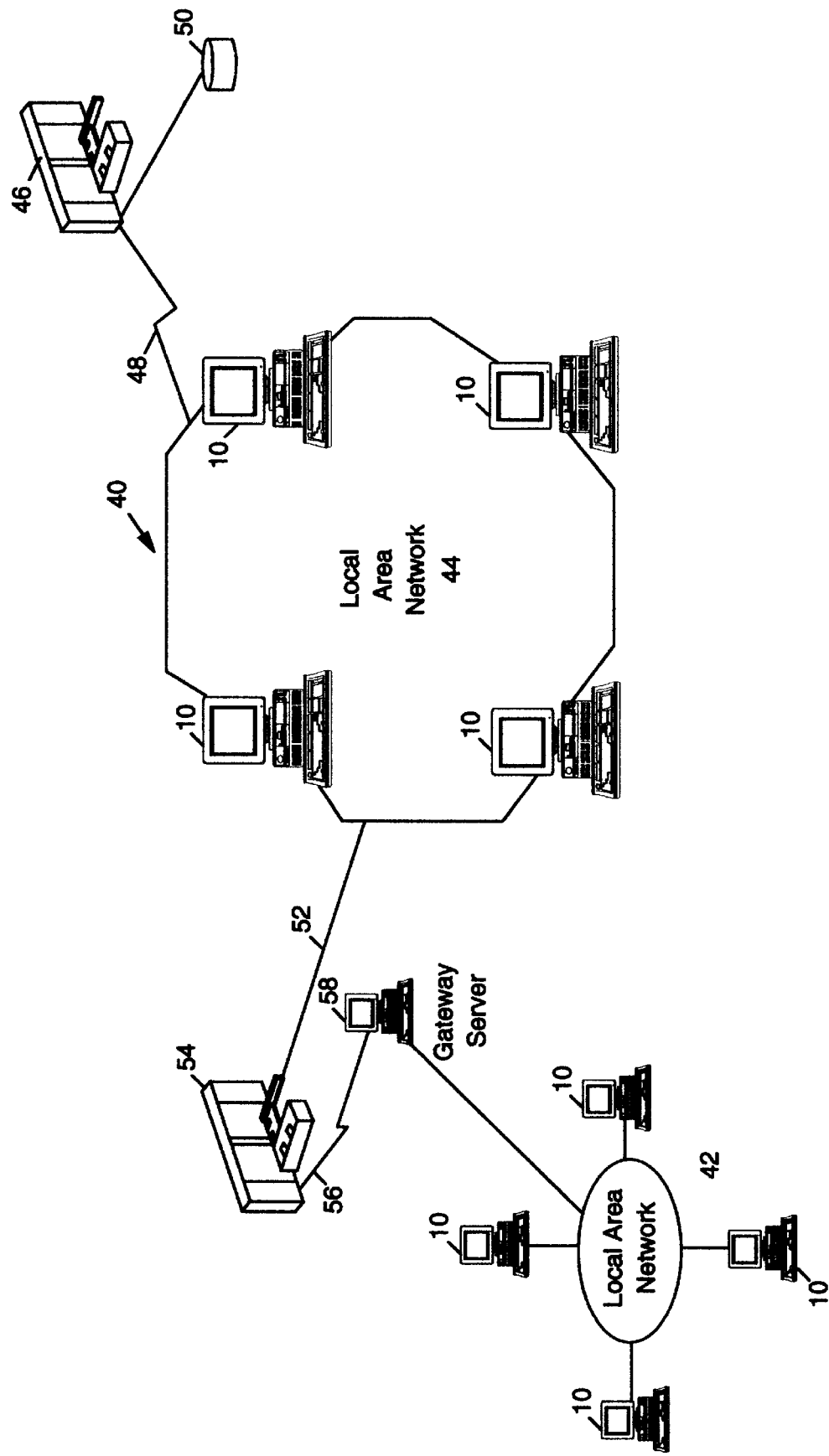
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from IBM. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a clustered Web server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The session services facilities implemented in a plug-in servlet engine resulting from use of the present invention may be stored on any of the various media types used by the long-term storage 30. This code will typically be installed in a server 46, which processes requests that come from a user having a computer such as the workstation 10.

While servers in Web environments may not typically include a display device 24, the preferred embodiment of the present invention uses a display device 24 in order to allow the plug-in servlet engine to be configured, for example by a system administrator.

The preferred embodiment of the present invention will now be discussed with reference to FIGS. 3 and 4.

In the preferred embodiment, the present invention is implemented as a computer software program. This program will be used where a client has sent a request for data to a server, and comprises part of the processing done on the server side of the network. Typically, the program will be used in an Internet environment, where the server is a Web server and the request is formatted using HTTP (or HTTPS). Alternatively, the connection may be to a corporate intranet (that is, a network owned or managed internally to the user's company) of which the user's computer is a component, where this corporate intranet provides services in a similar manner to the Internet. Use of the term "Internet" herein, when discussing processing associated with the user's request, includes processing that occurs in an intranet, unless otherwise stated. The program code of the preferred embodiment will be implemented as objects in an object-oriented programming language such as Java, which are incorporated along with other objects of a plug-in servlet engine object to run as executable programs. However, the inventive concepts of the present invention are not limited to implementation in an object-oriented environment, nor to implementation in the Java language.

Figure 3:
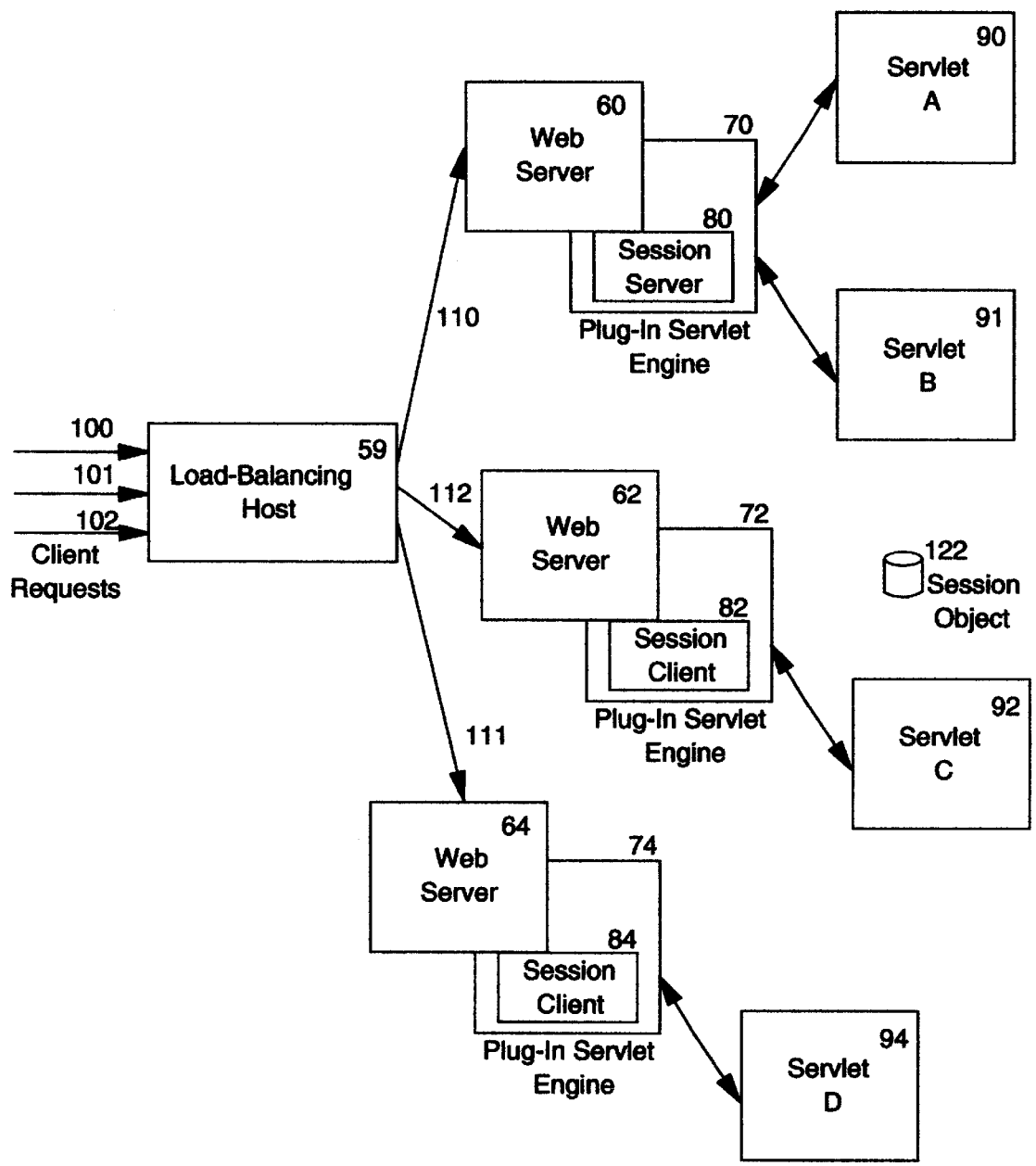
FIG. 3 illustrates a model of the clustered server environment in which the present invention may be practiced, showing the addition of the plug-in servlet engine and its relationship to Web servers and servlets.

FIG. 3 illustrates a model of the clustered server environment in which the present invention may be practiced, and shows how this invention interacts with other components of the environment. A Web server 60 may be connected to any number of other Web servers, shown here as 62 and 64. Clustering multiple servers in this way provides for increased capacity with which HTTP requests at a Web site can be processed. A load-balancing host 59 functions as a type of front-end processor to these servers, receiving client requests 100, 101, 102 and then routing those requests (shown here as 110, 111, 112) to a server selected according to policies implemented in the load-balancing host software. Note that the requests 110, 111, 112 are shown being sent to specific Web servers: this is merely an example of a possible outcome of the load balancing process. Load-balancing techniques are known in the art, and do not form part of the present invention.

The present invention solves the previously-discussed problem of not being able to extend session services support to this clustered server environment. This is accomplished by providing session services management features in a plug-in servlet engine, which is executable code that extends the functionality of the Web server. One of these servlet engines will be installed on each Web server that will participate in this session-management solution. One of the servlet engines will be configured to function as a Session Server, and the others will be configured to function as Session Clients. See FIG. 3, where a plug-in servlet engine 70, 72, 74 which embodies the present invention is used with each of the Web servers (60, 62, 64 respectively), and the servlet engine 70 in Web server 60 is designated as the session server. According to the preferred embodiment of the present invention, any servlet engine can be chosen to function as the session server, and the assigned roles (i.e. server or client) can be changed using a configuration process. Thus, no specialized servlet engine is required. This solution maximizes efficiency of the present invention, whereby a different servlet engine can take over the session server role if an outage occurs at the prior session server. The manner in which this configuration is performed does not form part of the present invention. Preferably, the system administrator will be prompted by a configuration routine to specify which servlet engines are to function as session clients, and which is to function as a session server.

The configuration process may also allow a servlet engine to be configured as neither a session server nor a session client, for the situation in which the servlet engine is not currently operating as part of a clustered environment. In this "stand-alone" mode, the servlet engine is not using the inventive concepts of the present invention. Thus, this scenario will not be discussed further.

Optionally, the operation of the session services feature can be optimized by restricting the servlet engine functioning as the session server to providing only session services during the time in which it is the session server. In that case, no servlets would be invoked from the associated server, and thus the servlets shown as 90, 91 in FIG. 3 would not be used while servlet engine 70 was the session server. When no servlets are invoked, no servlet-created objects get stored into the server's memory, and thus the amount of memory available for managing session services is maximized. This would be accomplished by configuring the load-balancing host policies to not route client requests to this servlet engine while it functions as a session server.

A servlet engine may provide any number of facilities for use by the servlets. The session services facility of the present invention is one example, and is shown as session server 80 and session clients 82, 84, each of which resides inside their respective servlet engines (as shown). Any of the Web servers may invoke the services of a servlet available to that server, shown here as servlets 90, 91, 92, 94, to perform specific processing of a client's request. The manner in which a Web server determines that a servlet should be invoked, and in which that invocation occurs, are known in the art and do not form part of the present invention. Further, the manner in which the Web servers communicate with one another is done according to well-understood techniques, and does not form part of the present invention. In the preferred embodiment, a plug-in servlet engine which embodies the session management facility of the present invention is added to the executable code running on the Web server by the installation process of the plug-in. Preferably, this installation process modifies the configuration file of the Web server to redirect specific types of messages (including those destined for servlet processing) to this plug-in. Once installed, the system administrator can then designate one of the Web servers, and its associated servlet engine plug-in, as the session server.

When an HTTP request 100, 101, 102 from a client is sent from the load-balancing host 59 as request 110, 111, 112 to one of the Web servers 60, 62, 64, the request will be passed from the Web server to the plug-in servlet engine if it meets the criteria stored in the rewritten server configuration file. For example, if the Web server determines that servlet processing is required for this request, then a servlet-identifying string will appear as part of the host destination address in the URL. The configuration file will be used to recognize that this is a request going to a servlet, and will redirect it to the plug-in. This same technique applies to any of the servers in the clustered environment. For illustrative purposes, assume the request is sent to Web server 62, and is designated for processing by servlet 92.

When the plug-in servlet engine 72 gets the request 112, the request may or may not include a session identifier for a session with this client. If this is the first request of a new session, no session ID will be present. If this is a request of an existing session, then there will be a session ID included using either the cookie mechanism or URL rewriting, as discussed earlier. In the preferred embodiment, the servlet engine passes this request on to the proper servlet (that is, the one identified by the syntax of the URL in the HTTP request) by invoking the servlet's "service" method, which is the standard API used to communicate with a servlet according to the Java Servlet "HttpServletRequest" API definition. (Changes may be required before passing this request to the servlet. For example, if URL rewriting is used, the servlet engine will strip the session ID from the address in the URL before the request is forwarded.) The service method has a request object and a response object as parameters. These objects encapsulate data sent to and from the servlet 92. The servlet engine may make changes to the request before forwarding it to the servlet, for example by modifying the URL so that the proper servlet is identified by the address in the URL.

Note that specific method invocations (including parameters) are referenced herein. These method names refer to existing interface definitions that may be used when the present invention is implemented in the Java programming language, according to the Java API and Java Servlet API, and are given to aid in understanding the preferred embodiment. However, the inventive concepts of the present invention are not limited to using these specific method invocations.

The function of a servlet is application-specific. Some applications have a need to maintain session information (such as the on-line shopping application previously discussed), while others do not (such as the simple request for locating a Web page and displaying that page in a browser). If the servlet needs session-related information, the servlet developer will have coded session information accessing calls as part of the servlet code. The preferred embodiment of the present invention does not require the programmer to add any logic to the servlet code he has already written: the session services operate transparently from the servlet's point of view.

If a servlet is written not to use session-related information, the servlet will perform its specific processing, eventually finishing and returning its results to the server through the response object with which it was invoked. While the servlet may have been invoked with a valid session ID present in the request object, it will not have made use of that session. The features of the present invention by which session services are used by servlets are not applicable to this scenario, and this scenario will not be discussed further.

If session services are required for this servlet's application, then the session services features of the present invention are used. According to the present invention, a servlet in this scenario will include code to get the session object for this session, and update that object to reflect session information related to the servlet's processing. When the servlet processing is finished, the session object is returned to the session pool, where it can be accessed for subsequent transactions with this servlet or a different servlet in the clustered environment. In this way, the state of the session can be communicated among the clustered servers and their servlets.

Figure 4A:
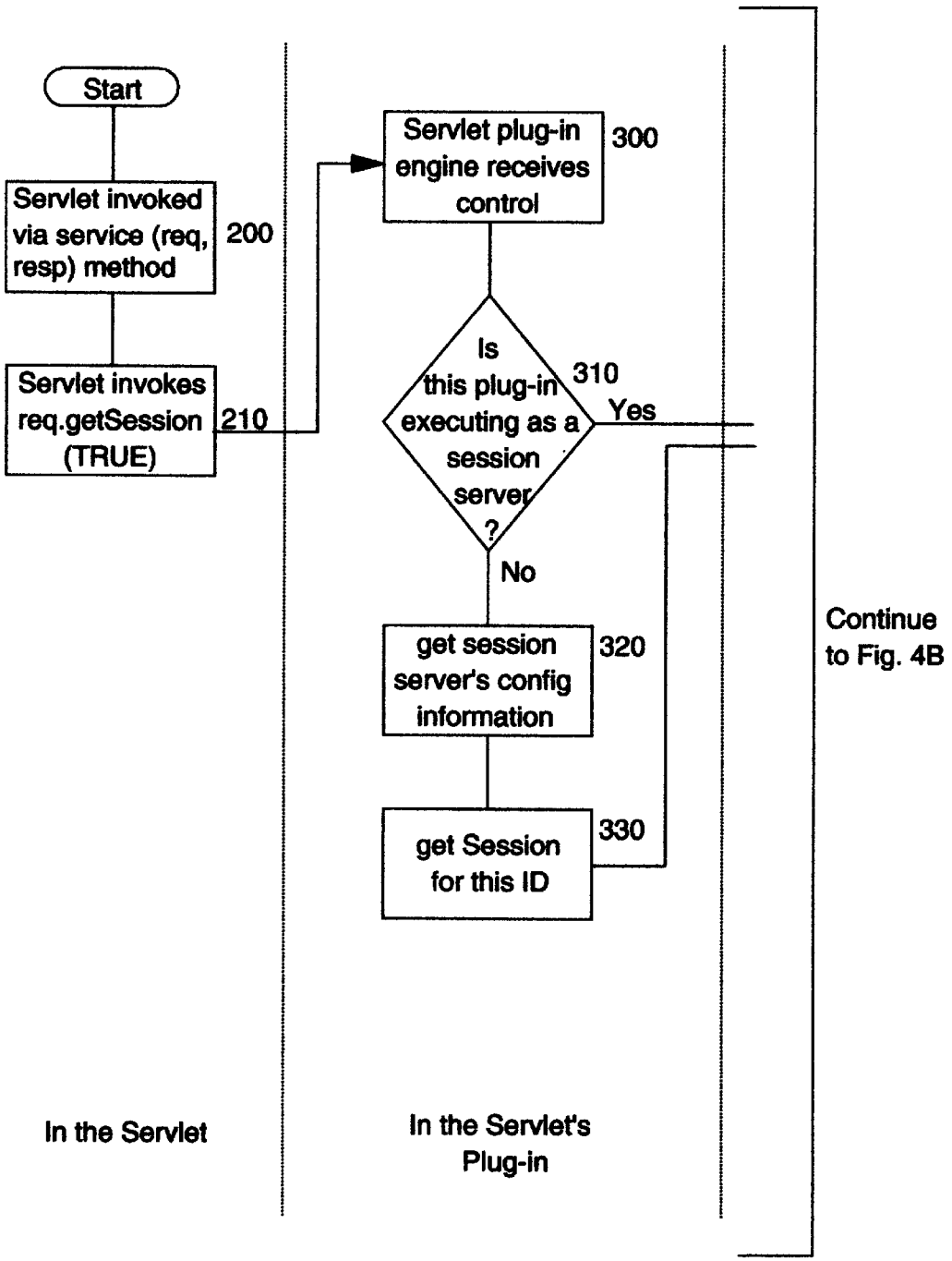
FIGS. 4A, 4B and 4C illustrate a flow chart which sets forth the logic involved with the present invention to use and update session information.
Figure 4B:
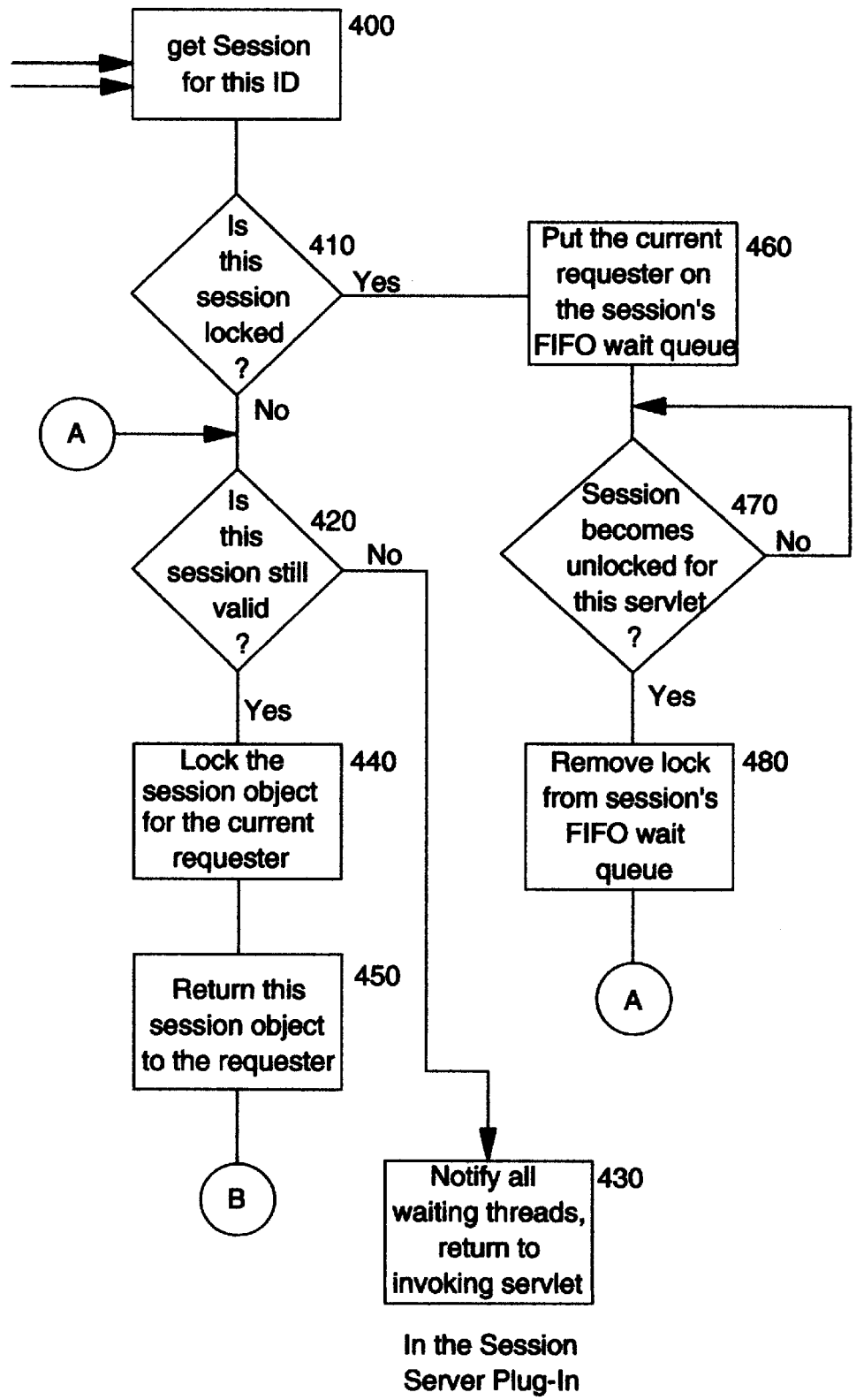
Figure 4C:
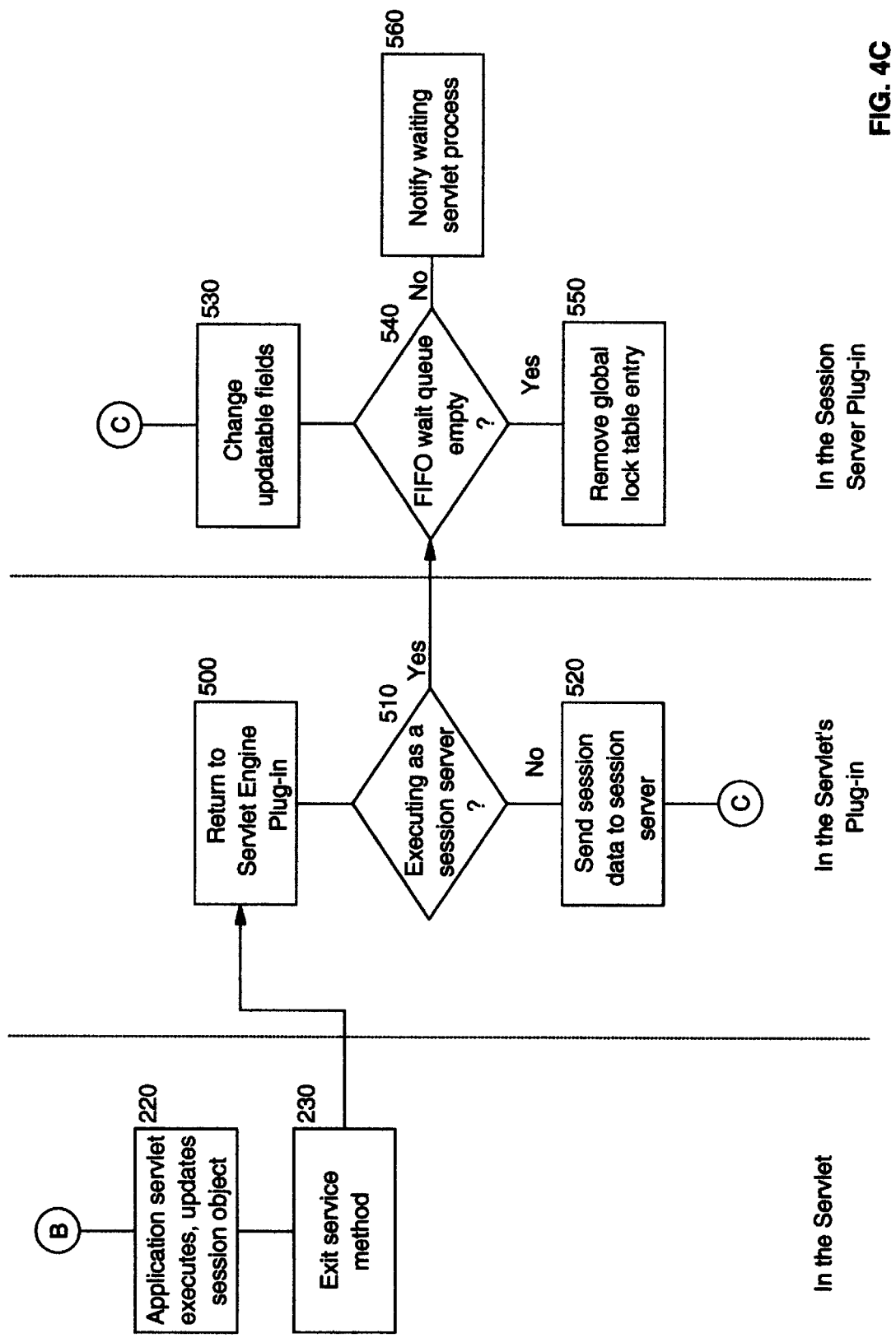

FIG. 4 illustrates the logic used in the preferred embodiment to enable a servlet to get the session object, update that object, and return it to the pool. FIG. 4 further illustrates the logic whereby the present invention uses a locking technique to solve the previously-discussed problem of servlets inadvertently overwriting state information another servlet has stored in the session object.

Step 200 shows that the servlet receives control after its service method has been invoked from the plug-in servlet engine. As discussed earlier, a request object and a response object are passed as parameters.

According to the Java Servlet API, a getSession method is defined that can be invoked to retrieve session information from the request object. The servlet code invokes this getSession method at Step 210. A "create" flag, which is set to "true" in the preferred embodiment to indicate that a session should be created if one does not already exist, is passed as a parameter.

The getSession request will be sent to the session services feature of the servlet engine residing in the Web server with which this servlet is associated. At Step 300, the servlet engine receives control. The transfer from the logic in the leftmost column of FIG. 4 to the logic in the middle column represents that the location of the logic processing has changed. As indicated in FIG. 4, the logic in the leftmost column resides in the application servlet, the logic in the middle column resides in the servlet engine (functioning as a session client) associated with that application servlet, and the logic in the rightmost column resides in the servlet engine functioning as the session server (which may or may not be the same servlet engine of the middle column).

Step 310 indicates that different processing applies, depending on whether the servlet engine is executing as a session client or as a session server. If it is executing as a session client, then the client needs to communicate with the session server to get the session object from the session pool. Control transfers to Step 320 to begin this process. Otherwise, if this is a session server, control transfers to Step 400.

Step 320 indicates that, in the preferred embodiment, the session client will get configuration properties from the session server. There are a number of such session properties defined for use in the Session Tracking feature of the Java Servlet API. These properties include such things as the length of time for which a session can be inactive before it should be considered expired, and deleted from the system; how often to check for inactive sessions; whether cookies or URL rewriting is being used to implement session services; etc. When the session services feature of the plug-in servlet engine is executing as a session server, or when a single server exists (i.e. a non-clustered environment), this information is readily available from the server's properties (configuration) file. However, when the present invention is used to extend session tracking to the clustered server environment, it is possible that different servers may have different values for these properties. In order for the servers to operate in a consistent manner within the cluster, the present invention provides means for using a single, central set of values. According to the preferred embodiment, that set of values is the one stored in the session server's properties file. If the servlet engine is functioning as a session client, then that client's properties file is to be ignored, using the values from the session server's file instead. This session client will use the session server's properties for the sessions retrieved for this client's servlets, while those servlets are executing. For example, the session client will check for whether URL rewriting is active before attempting to retrieve a session ID from the URL. In this way, session services can be distributed among the various servlet engines.

The next step for the session client is to get the session object for this session, at Step 330. This is done by extracting the session identifier from the request object. In the preferred embodiment, the method getRequestedSessionId will return the identifier defined in the session tracking implementation. The session ID is then used to request the corresponding session object from the session server's session pool. The process by which this occurs is described below with reference to Steps 400 through 480.

Control reaches Step 400 when the session client has requested a specific session ID's object from the session server (Step 330), or when the comparison at Step 310 indicated that this application servlet's servlet engine was functioning as a session server. In the latter case, the session server will need to extract the session ID from the request object, as the session client did at Step 330.

Step 410 indicates that a global lock table of the preferred embodiment is checked to determine if this session's object is already locked by another servlet thread. The present invention uses locking and wait queues for the session objects, to ensure that access to the session objects is serialized, one servlet accessing a session object at a time. This is a solution to the previously-discussed problem of servlets being able to inadvertently overwrite each other's data. In the preferred embodiment, a two-tiered approach to locking is used, although the inventive concepts apply equally well to a single-tiered approach. The two tiers comprise a global locking table, where an entry is kept for each session object indicating whether the object is currently locked or unlocked. (Alternatively, entries may be kept only for session objects that are locked, with the absence of an entry indicating the status as being currently unlocked.) The second tier is a First-In, First-out (FIFO) queue for each session object, where the queue is used to keep track of servlet threads that are waiting for access to this session object. In the single-tiered approach mentioned previously, the FIFO queues would suffice to implement the locking function. In this approach, the FIFO queue would contain a first entry for the servlet process currently holding the lock, as well as subsequent entries for any waiting processes. Then, the locked or unlocked status for a particular queue would be determined by checking to see if the FIFO wait queue was empty (empty indicating that the object is unlocked). Mechanisms for implementing FIFO queues and locking are well known to one of ordinary skill in the art, and will not be explained in detail.

If the test at Step 410 is negative, indicating that the session is not locked, it is not necessarily available for use by the requesting application servlet. At Step 420, another test is made in the preferred embodiment, to account for the situation where a session may have become invalid (for example, the value of the session server's inactivity property may have been exceeded, indicating that the session has become inactive for too long and is no longer considered valid). If the session is not valid, then Step 430 generates events to notify the waiting threads. Otherwise, the session is still valid, and control transfers to Step 440, where the entry in the global lock table is updated to indicate that this servlet now has a lock on this session object. (Alternatively, in a single-tiered queuing approach, a first entry would be placed on the FIFO queue for this session object.)

At Step 450, the session object is returned to the requester by returning from the method invocation. The application servlet then begins executing again (shown as Step 220), and will update the session object during its processing, according to the code written by the servlet developer. At Step 230, the application has finished its processing, and returns to the servlet engine plug-in, with the request object's session object reflecting the changes made by the developer and the response object containing whatever output will be returned to the client browser. The servlet engine is shown as receiving control at Step 500.

If the test at Step 410 is positive, indicating that the session is already locked by another application servlet, control transfers to Step 460. At Step 460, an entry will be placed on this session's FIFO wait queue, indicating that this servlet is waiting for the object to be unlocked. As is understood by one of ordinary skill in the art, the processing of that servlet will suspend until the servlet's lock gets to the head of the FIFO queue and the object is unlocked. This is shown as the repeating test loop of Step 470, which asks whether the session object has become unlocked and available to this servlet (that is, this servlet was at the head of the queue). The manner in which this test is actually made does not form part of the present invention, but it will be obvious that the testing does not repeat continually. Polling may be done at intervals, or a notification event may be generated, etc. In the preferred embodiment, notification events are used. Such techniques are well known in the art.

Once the session object becomes unlocked and available for this servlet, control transfers to Step 480. To indicate that this servlet is no longer waiting, its entry is removed from the session object's FIFO wait queue. (In the single-tier approach, the lock entry would remain until processing had completed.) Control then transfers to Step 420, to determine whether the session is still valid.

Step 510 indicates that the processing is different, based on whether the servlet engine is executing as a session client or as a session server. If it is executing as a session client, then the client needs to communicate with the session server to send the session object back to the session pool. The test at Step 510 will have a negative response, and control transfers to Step 520. Otherwise, if this is a session server, control transfers to Step 540.

At Step 520, a synchronization method is invoked, passing the session object as a parameter, which causes the session server to receive control at Step 530. Use of this synchronization method allows the session client to send updates for the session object to the session server.

At Step 530, any fields in the session object the programmer is allowed to modify via method calls are carried over to the session server's copy of the given session object. Control then transfers to Step 540, where a test is made to determine if the FIFO wait queue for this session object is empty. If so, then at Step 550 the entry in the global lock table will be removed; otherwise, at Step 560 the next servlet process from the wait queue will be dispatched. It will be obvious to one of ordinary skill in the art that this dispatching process occurs according to the logic beginning at Step 470, where the logic applies to execution for a different waiting servlet thread.

In an optional feature of the present invention, a registration process may be used to optimize the distribution of the session server's configuration properties to the session clients. When used, this feature replaces the need for Step 320 of FIG. 4. The registration process comprises having each session client send a registration message (for example, using a method call such as "register (address)" as part of its initialization, where address is an identifier by which this session client can be located) to the session server. (The address of the session server is known to the session clients by a configuration parameter.) This registration process enables the session server to know the address of all the session clients, so that when an update occurs to the session configuration properties, the session server can automatically propagate the revised properties to each client (for example, by invoking a method such as "config (new_data)").

In another optional feature of the present invention, the preferred embodiment uses Remote Method Invocation ("RMI") to enable the session service invocations to operate transparently from the application servlet's point of view. That is, the invocation will be serviced locally if appropriate, or dispatched to a remote server for processing, if that is appropriate.

RMI is a technique for distributed Java applications, whereby the methods of a remote Java object can be invoked from other Java virtual machines, even though the virtual machine may be operating on a different server than the one on which the object is located. This is accomplished by making a reference to the object available to the application that wishes to invoke one of the object's methods. The reference can be made available either by the application program looking up the object's location (using a method invocation), or by passing the reference information to the object as a parameter to the application. This reference is then used when invoking the object's method, and serves to automatically route the request to the proper location. While the preferred embodiment has been described using RMI, the inventive concepts of the present invention are not limited to use of this technique for method invocations.

In yet another optional feature of the present invention, a technique is defined whereby an application servlet running in a particular Web server may access and update session objects for sessions other than the one with which the application servlet was invoked. This may be useful in a number of situations. For example, statistical data can be gathered by the application servlet about all the servlets currently executing; the addresses of the Web pages from which the servlets were invoked can be gathered; user IDs associated with currently executing sessions can be gathered; etc. Or, the application may update the session objects associated with a number of servlets to cause a message to be written into the Web pages that will be returned to the client browsers. According to this technique, the application servlet invokes a method that sends a request to the session server, asking for the session IDs of all valid sessions. The session server retrieves this information related to its pool of sessions, and returns it to the requesting application servlet. The application servlet can then access each session ID in turn from this list (or perhaps select some subset of the session IDs that is of interest, depending on the needs of the application). For each selected session ID, the session object is retrieved by sending a request to the session server. The application servlet can then modify any fields of this object that can be updated by a method invocation as it processes its defined task. When the updates are finished, the application servlet invokes a synchronization method (as was done at Step 520 of FIG. 4), passing the revised session data to the session server. The session server then changes its copy of the appropriate session object. The locking mechanism discussed with reference to FIG. 4 can be used to ensure the session server changes the session object when no other thread is using it.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. In a computing environment having a connection to a network, computer readable code readable by a computer system in said environment, for managing session-related state information in a clustered server environment, comprising:

at least one client;

two or more servers operating as a server cluster;

at least two client requests generated by one of said clients, wherein said at least two client requests form an ongoing session and may be received over said network by different ones of said servers;

one or more servlets, each of said servlets executable by at least one of said servers; and one or more servlet engines, each of said engines running in a different one of said servers, wherein each of said servlet engines comprises:

a subprocess for configuring said servlet engine, wherein said servlet engine may be configured as a session client or a session server;

a subprocess, operable in said servlet engine configured as said session server, for managing a session pool, said session pool comprising a plurality of session objects wherein each of said session objects stores state information corresponding to one of said ongoing sessions between one of said clients and one or more of said servers from said server cluster, wherein said subprocess for managing said session pool enables any of said session objects to be accessed by a selected servlet without regard to which of said servers in said server pool is executing said selected servlet and wherein said subprocess further comprises:

a subprocess for receiving a session object retrieval request from any of said session clients, said request specifying a particular session identifier of a particular session object to be retrieved from said session pool;

a subprocess for locating said particular session object in said session pool, using said particular session identifier;

a subprocess for returning said located session object to said session client as a response to said session object retrieval request;

a subprocess for selectively receiving an updated version of said returned session object from said session client; and a subprocess for replacing updatable fields of said particular session object in said session pool using said received updated version;

a subprocess for receiving one of said client requests when said client request is destined for one of said servlets;

a subprocess for making any necessary updates to said client request; and a subprocess for forwarding said updated client request from said servlet engine to said servlet.

2. Computer readable code for managing session-related state information in a clustered server environment according to claim 1, wherein said servlet engine configured as said session server further comprises a subprocess for controlling access to each individual one of said session objects in said session pool using a locking mechanism to serialize said access.

3. Computer readable code for managing session-related state information in a clustered server environment according to claim 1, further comprising:

a subprocess, operable in a particular one of said servlet engines configured as one of said session clients, for sending said session object retrieval request to said session server on behalf of a particular servlet being executed by a particular one of said servers on which said particular servlet engine is executing;

a subprocess, operable in said particular servlet engine, for receiving said returned session object in said response from said session server; and a subprocess, operable in said particular servlet engine, for making said received session object available to said particular servlet.

4. Computer readable code for managing session-related state information in a clustered server environment according to claim 1, wherein said session server is optimized for providing session services by not having application servlets running on said server on which said session server is running.

5. Computer readable code for managing session-related state information in a clustered server environment according to claim 4, further comprising:

a subprocess, operable in said particular servlet, for updating said received session object to contain updated session state information, said updated session state information reflecting processing of said client request as part of said ongoing session;

a subprocess, operable in said particular servlet, for making said updated session object available to said particular servlet engine; and a subprocess, operable in said particular servlet engine, for sending said updated session object to said session server as said updated version.

6. Computer readable code for managing session-related state information in a clustered server environment according to claim 4, wherein each of said servlet engines further comprises:

a subprocess for requesting a list of all valid session identifiers from said session server;

a subprocess for requesting, from said session server, said session object for any of said session identifiers on said list;

a subprocess for updating said requested session object; and a subprocess for returning said updated session object to said session server for reflecting said updates.

7. Computer readable code for managing session-related state information in a clustered server environment according to claim 1, wherein said session-related state information is maintained without use of a persistent data store.

8. Computer readable code for managing session-related state information in a clustered server environment according to claim 1, wherein said code uses standard Application Programming Interface ("API") calls.

9. Computer readable code for managing session-related state information in a clustered server environment according to claim 8, wherein said API calls use Remote Method Invocation to achieve transparency at an invoking servlet.

10. Computer readable code for managing session-related state information in a clustered server environment according to claim 1, wherein a central copy of session-related configuration data is propagated from said session server to all of said session clients.

11. Computer readable code for managing session-related state information in a clustered server environment according to claim 10, wherein each of said session clients registers with said session server to enable said propagation to occur whenever said configuration data changes.

12. A system for managing session-related state information in a clustered server environment having a connection to a network, comprising:

at least one client;

two or more servers operating as a server cluster;

at least two client requests generated by one of said clients, wherein said at least two client requests form an ongoing session and may be received over said network by different ones of said servers;

one or more servlets, each of said servlets executable by at least one of said servers; and one or more servlet engines, each of said engines running in a different one of said servers, wherein each of said servlet engines comprises:

means for configuring said servlet engine, wherein said servlet engine may be configured as a session client or a session server;

means, operable in said servlet engine configured as said session server, for managing a session pool, said session pool comprising a plurality of session objects wherein each of said session objects stores state information corresponding to one of said ongoing sessions between one of said clients and one or more of said servers from said server cluster, wherein said means for managing said session pool enables any of said session objects to be accessed by a selected servlet without regard to which of said servers in said server pool is executing said selected servlet and wherein said means further comprises:

means for receiving a session object retrieval request from any of said session clients, said request specifying a particular session identifier of a particular session object to be retrieved from said session pool;

means for locating said particular session object in said session pool, using said particular session identifier;

means for returning said located session object to said session client as a response to said session object retrieval request;

means for selectively receiving an updated version of said returned session object from said session client; and means for replacing updatable fields of said particular session object in said session pool using said received updated version;

means for receiving one of said client requests when said client request is destined for one of said servlets;

means for making any necessary updates to said client request; and means for forwarding said updated client request from said servlet engine to said servlet.

13. The system for managing session-related state information in a clustered server environment according to claim 12, wherein said servlet engine configured as said session server further comprises means for controlling access to each individual one of said session objects in said session pool using a locking mechanism to serialize said access.

14. The system for managing session-related state information in a clustered server environment according to claim 12, further comprising:

means, operable in a particular one of said servlet engines configured as one of said session clients, for sending said session object retrieval request to said session server on behalf of a particular servlet being executed by a particular one of said servers on which said particular servlet engine is executing;

means, operable in said particular servlet engine, for receiving said returned session object in said response from said session server; and means, operable in said particular servlet engine, for making said received session object available to said particular servlet.

15. The system for managing session-related state information in a clustered server environment according to claim 11, wherein said session server is optimized for providing session services by not having application servlets running on said server on which said session server is running.

16. The system for managing session-related state information in a clustered server environment according to claim 14, further comprising:

means, operable in said particular servlet, for updating said received session object to contain updated session state information, said updated session state information reflecting processing of said client request as part of said ongoing session;

means, operable in said particular servlet, for making said updated session object available to said particular servlet engine; and means, operable in said particular servlet engine, for sending said updated session object to said session server as said updated version.

17. The system for managing session-related state information in a clustered server environment according to claim 14, wherein each of said servlet engines further comprises:

means for requesting a list of all valid session identifiers from said session server;

means for requesting, from said session server, said session object for any of said session identifiers on said list;

means for updating said requested session object; and means for returning said updated session object to said session server for reflecting said updates.

18. The system for managing session-related state information in a clustered server environment according to claim 12, wherein said session-related state information is maintained without use of a persistent data store.

19. The system for managing session-related state information in a clustered server environment according to claim 12, wherein said code uses standard Application Programming Interface ("API") calls.

20. The system for managing session-related state information in a clustered server environment according to claim 19, wherein said API calls use Remote Method Invocation to achieve transparency at an invoking servlet.

21. The system for managing session-related state information in a clustered server environment according to claim 12, wherein a central copy of session-related configuration data is propagated from said session server to all of said session clients.

22. The system for managing session-related state information in a clustered server environment according to claim 21, wherein each of said session clients registers with said session server to enable said propagation to occur whenever said configuration data changes.

23. A method for managing session-related state information in a clustered server environment having a connection to a network, comprising the steps of:

operating two or more servers as a server cluster;

generating at least two client requests from one of at least one clients, wherein said at least two client requests form an ongoing session and may be received over said network by different ones of said servers;

providing one or more servlets, each of said servlets executable by at least one of said servers;

providing one or more servlet engines, wherein each of said servlet engines runs in a different one or said one or more servers;

configuring each of said one or more servlet engines as a session client or a session server;

managing, by said servlet engine configured as said session server, a session pool, said session pool comprising a plurality of session objects wherein each of said session objects stores state information corresponding to one of said ongoing sessions between one of said clients and one or more of said servers from said server cluster, wherein said managing said session pool step enables any of said session objects to be accessed by a selected servlet without regard to which of said servers in said server pool is executing said selected servlet and wherein said managing step further comprises the steps of:

receiving a session object retrieval request from any of said session clients, said request specifying a particular session identifier of a particular session object to be retrieved from said session pool;

locating said particular session object in said session pool, using said particular session identifier;

returning said located session object to said session client as a response to said session object retrieval request;

selectively receiving an updated version of said returned session object from said session client; and replacing updatable fields of said particular session object in said session pool using said received updated version;

receiving one of said client requests in one of said servlet engines, when said client request is destined for one of said servlets;

making any necessary updates to said client request in said receiving servlet engine; and forwarding said updated client request from said servlet engine to said servlet.

24. The method for managing session-related state information in a clustered server environment according to claim 23, wherein said servlet engine configured as said session server further comprises the step of controlling access to each individual one of said session objects in said session using a locking mechanism to serialize said access.

25. The method for managing session-related state information in a clustered server environment according to claim 23, further comprising the steps of:

sending, from a particular one of said servlet engines configured as one of said session clients, said session object retrieval request to said session server on behalf of a particular servlet being executed by a particular one of said servers on which said particular servlet engine is executing;

receiving, by said particular servlet engine, said returned session object in said response from said session server; and making, by said particular servlet engine, said received session object available to said particular servlet.

26. The method for managing session-related state information in a clustered server environment according to claim 21, further comprising optimizing said session server for providing session services by not having application servlets running on said server on which said session server is running.

27. The method for managing session-related state information in a clustered server environment according to claim 25, further comprising the steps of:

updating, by said particular servlet, said received session object to contain updated session state information, said updated session state information reflecting processing of said client request as part of said ongoing session;

making, by said particular servlet, said updated session object available to said particular servlet engine; and sending, by said particular servlet engine, said updated session object to said session server as said updated version.

28. The method for managing session-related state information in a clustered server environment according to claim 25, wherein each of said servlet engines further comprises the steps of:

requesting a list of all valid session identifiers from said session server;

requesting, from said session server, said session object for any of said session identifiers on said list;

updating said requested session object; and returning said updated session object to said session server for reflecting said updates.

29. The method for managing session-related state information in a clustered server environment according to claim 23, wherein said session-related state information is maintained without use of a persistent data store.

30. The method for managing session-related state information in a clustered server environment according to claim 23, wherein said code uses standard Application Programming Interface ("API") calls.

31. The method for managing session-related state information in a clustered server environment according to claim 30, wherein said API calls use Remote Method Invocation to achieve transparency at an invoking servlet.

32. The method for managing session-related state information in a clustered server environment according to claim 23, further comprising the step of propagating a central copy of session-related configuration data from said session server to all of said session clients.

33. The method for managing session-related state information in a clustered server environment according to claim 32, further comprising the step of registering each of said session clients with said session server to enable said propagation to occur whenever said configuration data changes.

* * * * *